United States Patent [19]

Huang et al.

[11] Patent Number: 5,233,293

[45] Date of Patent: Aug. 3, 1993

[54] SENSOR FOR MEASURING THE SPEED AND/OR POSITION OF A PISTON IN RELATION TO THAT OF THE CYLINDER IT MOVES INSIDE OF IN A DASHPOT OR SHOCK ABSORBER

[75] Inventors: Zhen Huang, Wuppertal; Ludger Gesenhues, Witten; Hans-Jürgen Hoffmann, Wuppertal; Klaus Schmidt, Bergisch Gladbach; Reinhard Hölscher, Salzkotten; Thomas Krüner, Ennepetal, all of Fed. Rep. of Germany

[73] Assignee: August Bilstein GmbH & Co. KG, Ennepetal, Fed. Rep. of Germany

[21] Appl. No.: 792,424

[22] Filed: Nov. 15, 1991

[30] Foreign Application Priority Data

Nov. 17, 1990 [DE] Fed. Rep. of Germany ....... 4036704
Mar. 7, 1991 [DE] Fed. Rep. of Germany ....... 4107290
Aug. 12, 1991 [DE] Fed. Rep. of Germany ....... 4126586

[51] Int. Cl.⁵ ................ G01P 3/52; G01B 7/14; F16D 66/00
[52] U.S. Cl. ................ 324/207.15; 324/160; 324/163; 324/207.22; 324/207.24; 92/5 R; 188/1.11; 280/707
[58] Field of Search ....... 324/207.15–207.19, 324/207.22, 207.23, 207.24, 160, 163, 179; 188/1.11; 280/6.1, 840; 340/870.31, 870.32, 870.33; 91/1; 92/5; 336/45, 130, 136

[56] References Cited

U.S. PATENT DOCUMENTS

| | | | |
|---|---|---|---|
| 3,215,932 | 11/1965 | Sims et al. | 324/179 |
| 4,117,401 | 9/1978 | Glauert | 324/207.15 |
| 4,385,297 | 5/1983 | Schmitt et al. | 324/207.16 X |
| 4,455,555 | 6/1984 | Symonds et al. | 340/870.33 |
| 4,502,006 | 2/1985 | Goodwin et al. | 188/1.11 X |
| 4,638,670 | 1/1987 | Moser | 324/207.24 X |
| 4,883,150 | 11/1989 | Arai | 324/207.24 X |

FOREIGN PATENT DOCUMENTS

| | | | |
|---|---|---|---|
| 0203913 | 12/1982 | Japan | 324/207.15 |
| 0815630 | 3/1981 | U.S.S.R. | 324/207.15 |
| 1029000 | 7/1983 | U.S.S.R. | 324/207.24 |

Primary Examiner—Gerard R. Strecker
Attorney, Agent, or Firm—Max Fogiel

[57] ABSTRACT

A sensor for measuring the speed and/or position of a piston in relation to that of the cylinder it moves inside of in a dashpot of shock absorber for motor vehicles. The sensor consists of a permanent magnet (10) connected to the cylinder (1) and of a sensor winding (9) in the form of a cylindrical coil that operates in conjunction with the magnet. The sensor winding has leads at the ends. Additional leads for a shorter winding component (7 and 8) extend out separately upstream of the ends of the sensor winding.

13 Claims, 7 Drawing Sheets

SENSOR FOR MEASURING THE SPEED AND/OR POSITION OF A PISTON IN RELATION TO THAT OF THE CYLINDER IT MOVES INSIDE OF IN A DASHPOT OR SHOCK ABSORBER

BACKGROUND OF THE INVENTION

The invention concerns a sensor for measuring the speed and/or position of a piston in relation to that of the cylinder it moves inside of in a dashpot or shock absorber in a motor vehicle.

Dashpots or shock absorbers are employed as linkages that transmit vibrations from the roadway to the body by way of the wheel-suspension system. Shock absorbers are mainly employed at the front axle of the motor vehicle. The mechanisms are often provided with active or semi-active vibration-suppression controls to ensure passenger comfort and safety.

Such controls require measuring various variables of motion and transmitting them to the controls. These variables include the speed of the body in relation to that of the axle, the position of the piston in the cylinder, or the acceleration of the body. The controls convert them into parameters for varying the force that suppresses the vibrations.

German Patent 3 909 190 describes a relative-speed sensor for a dashpot. The sensor comprises a cylindrical coil accommodated in a jacket connected to the piston rod and a permanent magnet at the head of the cylinder. The sensor supplies a relative-speed signal derived from the voltage induced in the winding. It is impossible to measure and accordingly control how far inside or outside the piston is.

A sensor that operates precisely inside a dashpot and comprises a spool in the jacket and a magnet in the cylinder's bearing seal also has another drawback. Employed in a shock absorber, its results would be so imprecise as to render the absorber impossible to control. A shock absorber has a helical spring that rests against a disk in a tubular housing. The spring acts as an additional coil. The motion of the helical spring in relation to the sensor winding and the varying separation between the spring's windings generates inductive interference that the system processor cannot compensate for.

Again, shock absorbers often take up so much space that they have to be protected by rubber bellows instead of jackets. Such bellows prevent the use of a state-of-the-art sensor winding.

SUMMARY OF THE INVENTION

The object of the present invention is a sensor for the dashpot or shock absorber in a motor vehicle that will measure not only the speed of the axle in relation to that of the body but also the position of the piston at the end of both an inward and an outward stroke.

This object is attained in accordance with the invention by a sensor for measuring the speed and/or position of a piston in relation to that of the cylinder it moves inside of in a dashpot or shock absorber as recited in the claims.

The winding in a dashpot sensor can be accommodated in a jacket connected to the piston rod. The magnet can be accommodated on or in the wall of the cylinder. Another possibility is to accommodate the winding in the wall of the cylinder when the wall is made of non-magnetic material. If the dashpot has a double cylinder, the winding can be accommodated between them and the magnet can be connected to the piston or to the section of piston rod that enters the cylinder.

The winding in a shock absorber will preferably surround the piston rod below the suction-stroke stop and the magnet will be accommodated on or in the wall of the cylinder. Electrical connections will then extend out through the hollow piston rod.

The winding in another embodiment of a sensor for a shock absorber can be accommodated axially inside the hollow piston rod if the rod is of non-magnetic material. When the cylinder is made of non-magnetic material, it is of advantage to accommodate the magnet on the outer surface of the cylinder or on the inner surface of the housing. The opposite system is also possible, with the winding in the form of a cylindrical coil between the outer surface of a cylinder made of non-magnetic material and the inner surface of the housing and with the magnet on the piston rod.

An elevated induced voltage at the ends of the winding represents the inward and outward strokes. The voltage is separately detected. It is established by increasing the number of turns per unit of length at the ends. Two separate turns at the ends of the winding with separate leads extending outward will make it possible to interpret an extremely wide range of situations. The winding in another advantageous embodiment has tighter turns at the ends.

A very precise signal can be obtained if the component that the magnet is mounted on and the component that the winding is mounted on generate a closed magnetic circuit in terms of the magnetic field and if the magnet is polarized radially in relation to the piston rod. The magnet can be an annular magnet for example.

The magnet can also consist of separate magnets arrays in a ring.

The sensor in accordance with the invention is simple and passive. It can be employed without limiting the travel of the dashpot or shock absorber.

BRIEF DESCRIPTION OF THE DRAWINGS

One embodiment of the invention will now be described in detail with reference to the accompanying drawings, wherein.

DESCRIPTION OF THE PREFERRED EMBODIMENTS

Figure 1:
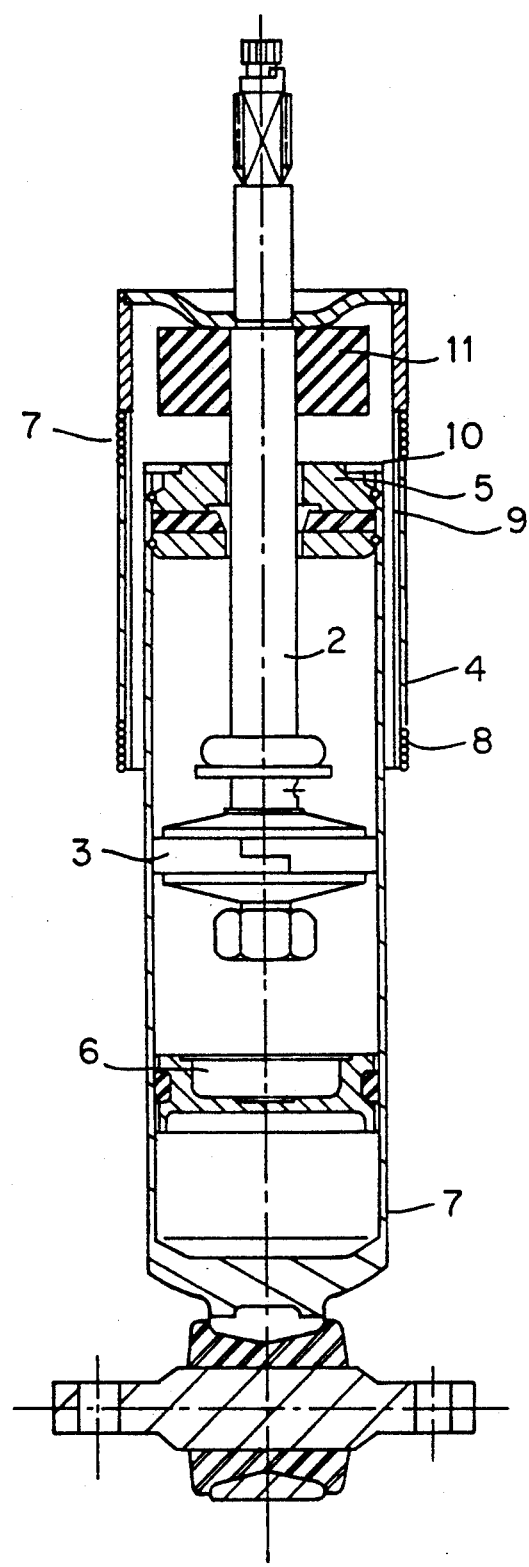
FIG. 1 illustrates a dashpot with a sensor with a sensor winding and test windings accommodated in a jacket and the magnet connected to the cylinder.

The variable hydraulic dashpot illustrated in FIG. 1 essentially comprises a cylinder 1 and a piston 3. The piston is mounted on a piston rod 2. The head 5 of the cylinder is solid and has a tightly sealed perforation for the piston rod to extend through. The head end of the cylinder is enclosed in a jacket 4 of non-magnetic material. Cylinder 1 comprises two compression chambers separated by a partition 6. Above partition 6, piston 3 is rigidly secured to moving piston rod 2, which travels back and forth through the perforation in head 5. Jacket 4 is made of non-magnetic material, is open at one end, and is mounted over the head end of cylinder 1. Embedded in and extending all the way along jacket 4 is a sensor winding 9. Two test windings 7 and 8 are wrapped around sensor winding 9 at the top and bottom of jacket 4. Test windings 7 and 8 are not as long as sensor winding 9. Their leads extend out separately. A permanent magnet 10 mounted on head 5 travels back and forth through the sensor winding and test windings. There is an air gap between magnet 10 and sensor winding 9 and test windings 7 and 8.

When an irregularity in the roadway forces cylinder 1 up, the magnet 10 inside its surrounding sensor winding 9 will travel up, inducing a voltage in the winding. Within the winding, the signal is proportional to the speed of cylinder 1 in relation to that of piston 3. Once magnet 10 arrives at the end of sensor winding 9, however, a voltage representing the magnet's extreme position and hence the permissible extreme position of piston 3 will also be induced in test winding 7.

The lowest possible outer position will similarly be detected by bottom test winding 8. The sensor-winding and test-winding leads extend separately or together to an unillustrated electronic processor for processing.

Figure 2:
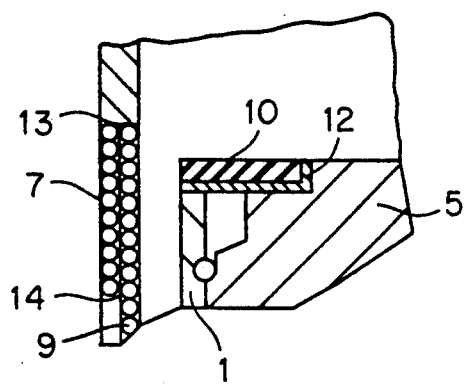
FIG. 2 is a detail of the upper section of the sensor winding with a magnet and an intermediate element.

The detail illustrated in FIG. 2 reveals the structure of the top of sensor winding 9 and test winding 7. A lead 14 deriving from test winding 7 extends out by itself. Another lead 13 extends out with the upper lead from sensor winding 9. It can also make sense to position a non-magnetic intermediate element 12 between head 5 and magnet 10 to prevent debilitation of the magnet's force by the iron in the cylinder.

Figure 3:
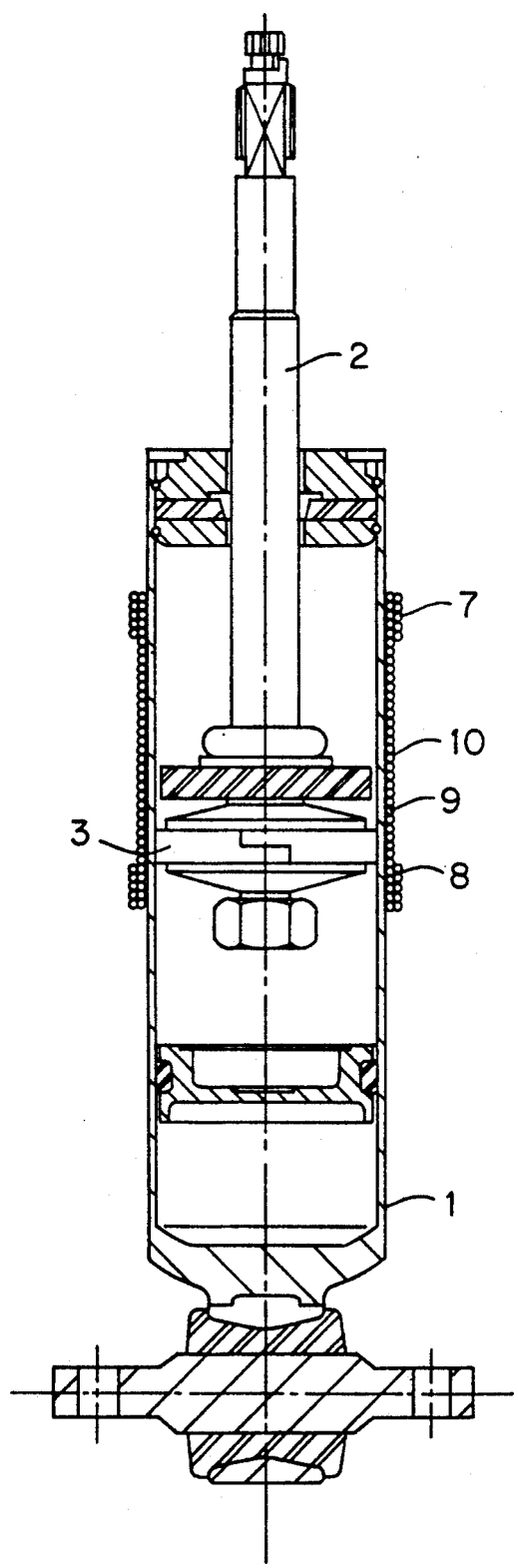
FIG. 3 illustrates a dashpot without a jacket and with a sensor with a sensor winding and test windings mounted on the cylinder and the magnet on the moving piston rod
Figure 4:
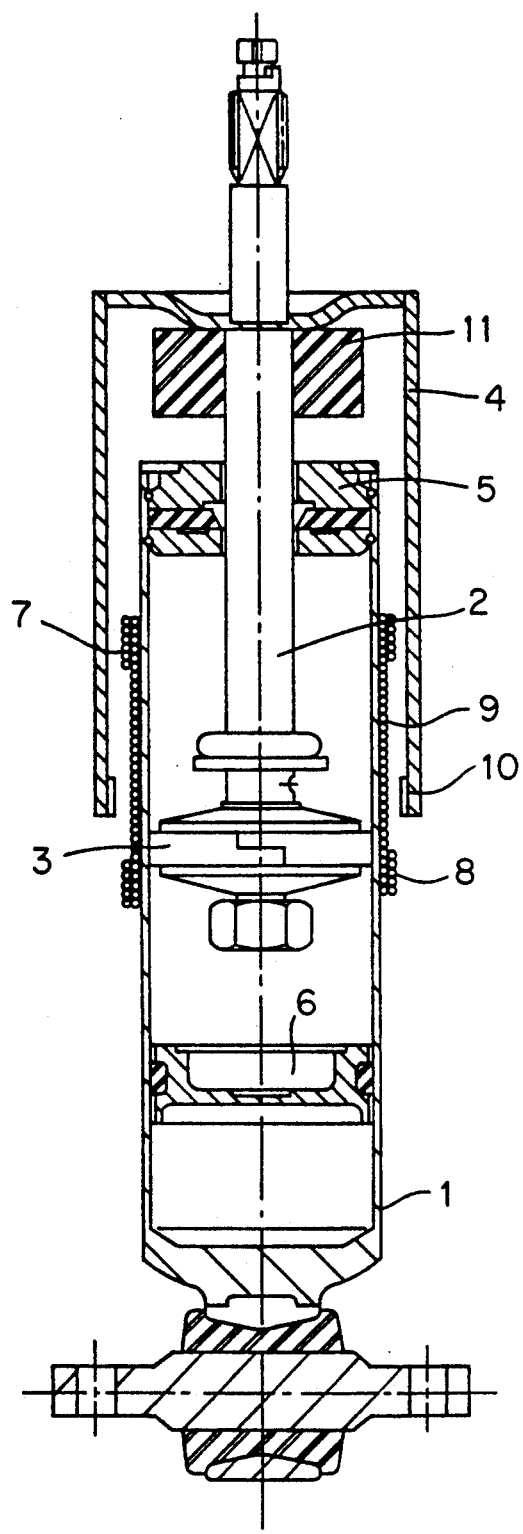
FIG. 4 illustrates a dashpot with a sensor with a sensor winding and test windings mounted on the cylinder and with the magnet accommodated in the jacket.

FIG. 3 illustrates a dashpot without a jacket. This system comprises a sensor winding and test windings mounted on the wall of a cylinder 1 made of non-magnetic material. It is protected from external interference by a dielectric wrap. It would also be conceivable to embed the sensor winding and test windings in the cylinder wall. A permanent magnet 10 for generating an induced voltage is mounted on piston 3 or on the bottom of piston rod 2. A voltage proportional to the speed ratio is again reduced in sensor winding 9. Furthermore, a signal representing the innermost and outermost positions is again induced in test windings 7 and 8. In FIG. 4, a sensor winding 9 and test windings 7 and 8 are mounted against or embedded in the wall of cylinder 1, which is made of non-magnetic material. Magnet 10 is specifically an annular magnet. It is mounted on a jacket 4, which connects it to a piston rod 2. The motion of piston 3 relative to cylinder 1 induces by the same principle a proportional voltage in sensor winding 9. As test windings 7 and 8 travel through magnet 10, they generate a signal representing the extreme positions of piston 3. Once the innermost or outermost position has been attained, the controls will augment the suppression of vibrations. The cylinder will impact a buffer 11 more slowly. The dashpot will not overstroke.

Figure 5:
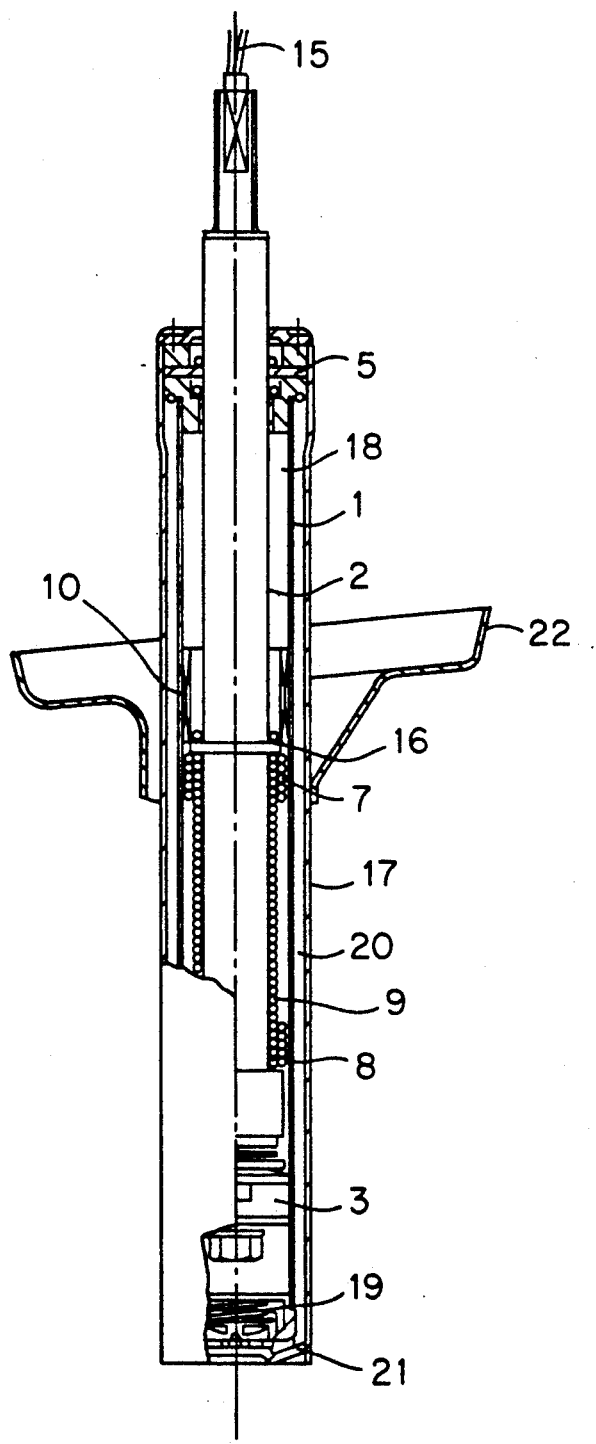
FIG. 5 illustrates a shock absorber with a sensor comprising a sensor winding and a terminal winding around the piston rod and a magnet connected to the cylinder.

The shock absorber illustrated in FIG. 5 operates on the double-cylinder principle. Cylinder 1 accommodates a chamber 18 demarcated at the top by a head 5 and at the bottom by a valve 19. A piston rod 2 travels in and out through head 5. Mounted on the rod inside the chamber is a piston 3 equipped with variable valves. Cylinder 1 is surrounded by a tubular housing 17. Between them is a compensation compartment 20. Compartment 20 is half full and chamber 18 completely full of oil. Housing 17 connects head 5 to a cap 21 at the bottom. Valve 19 rests on cap 21. Mounted on housing 17 is a disk 22 that accommodates an unillustrated helical spring. The maximal wheel-suspension extension is demarcated by a traction limit 16 on piston rod 2. A sensor winding 9 in the form of a cylindrical coil surrounds the section of the piston rod below traction limit 16. There is an additional winding 7 and 8 at each end of sensor winding 9. Windings 7 and 8 are not as long as sensor winding 9. Their leads are separate. A permanent magnet 10 in the form of a ring for example mounted against the inner surface of cylinder 1 surrounds sensor winding 9 and windings 7 and 8. If cylinder 1 is made of non-magnetic material, magnet 10 can be positioned between the outer surface of the cylinder and the inner surface of housing 17.

If the wheel springs out due to an irregularity in the roadway, cylinder 1 and housing 17 will be dragged down. Magnet 10 will travel down around sensor winding 9, inducing in sensor winding 9 a voltage proportional to the speed of piston 3 in relation to that of cylinder 1. Once magnet 10 arrives at the end of sensor winding 9, however, a voltage representing the magnet's extreme position and hence the permissible extreme extension of the wheel will also be induced in test winding 7. Winding 8 will indicate the wheel's innermost permissible position.

Figure 6:
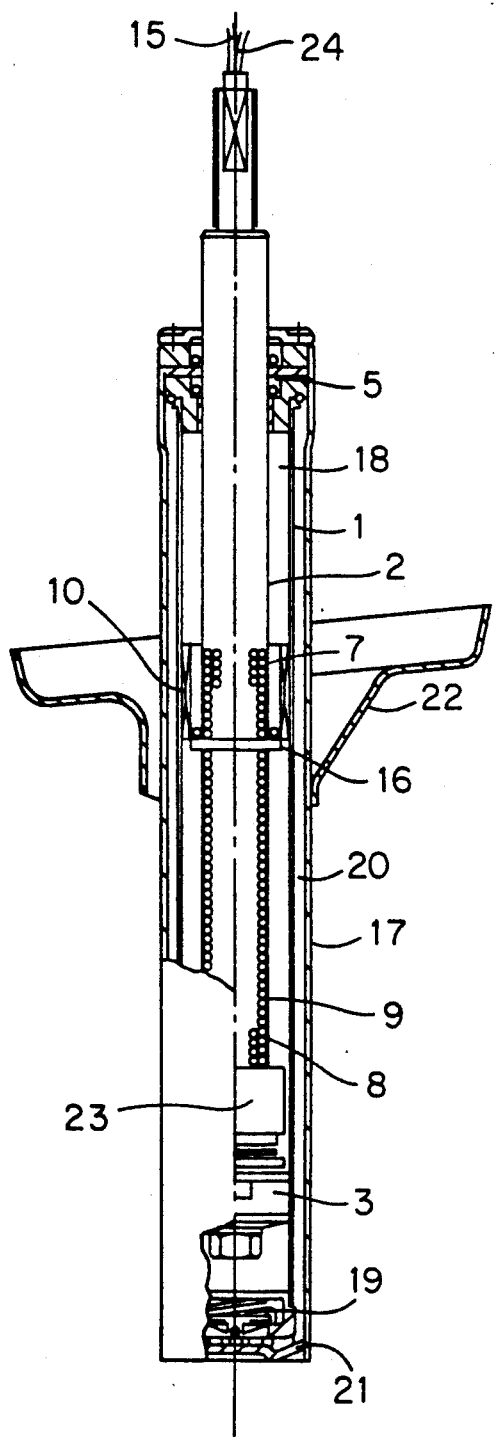
FIG. 6 illustrates a shock absorber with a sensor comprising a sensor winding and a terminal winding accommodated in a hollow piston rod and with a magnet connected to the cylinder.

The shock absorber illustrated in FIG. 6 is similar to that illustrated in FIG. 5. Piston rod 2 is made of non-magnetic material—non-magnetic chrome-nickel-steel for example—and sensor winding 9 and the windings 7 and 8 that indicate the innermost and outermost positions are accommodated axially inside piston rod 2. The permanent magnet 10 that induces the voltage is again mounted against the inner surface of cylinder 1.

Figure 7:
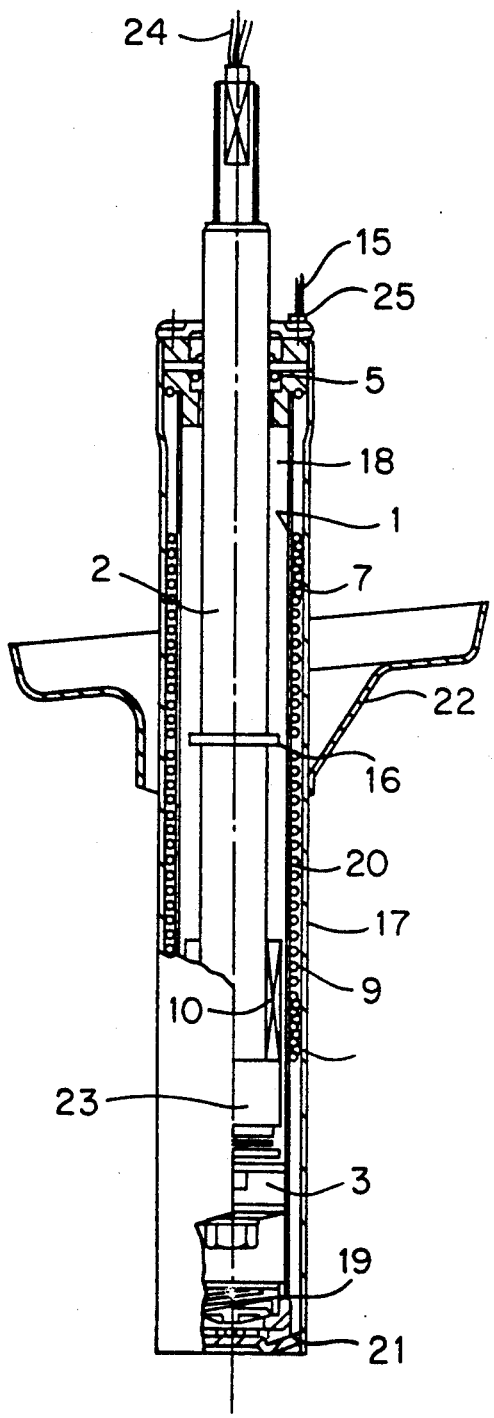
FIG. 7 illustrates a shock absorber with a sensor comprising a sensor winding and a terminal winding on the outer surface of the cylinder and with a magnet connected to the piston rod.

In FIG. 7, a winding 9 and the windings that indicate the innermost and outermost positions are mounted around the outer surface of a cylinder 1 of non-magnetic material. It would, however, be conceivable to mount the windings on the inner surface of tubular housing 17. The leads 10 in this version extend out inside compensation compartment 20 and are connected to a multiple-pole plug 25 accommodated in head 5. A preferably annular magnet 10 tightly surrounds piston rod 2 above magnetic valve 23. The motion of cylinder 1 relative to piston 3, which is connected to piston rod 2, induces by the same principle a proportional voltage in sensor winding 9. As winding 7 or 8 travels through magnet 10, it generates a signal representing the extreme positions of piston 6. Once the innermost or outermost position has been attained accordingly, the controls will augment the suppression of vibrations. Traction limit 16 will impact a buffer on head 5 more slowly.

It is not absolutely necessary for the piston rod 2 in the versions illustrated in FIGS. 5 and 7 to be made of non-magnetic material. The rod's effect participates in the sensing process in the form of a calculable dimension that can be eliminated by the unillustrated processor. The effect of the cylinder 1 in the versions illustrated in FIGS. 5 and 6 can also be calculated and compensated for.

Additional unillustrated variants of the procedure for sensing the relative speed and the innermost and outermost positions depend on increasing the number of turns per unit of length at each end of sensor winding 9. The turns can be closer together or multiply-wrapped. The leads from such a subsidiary winding will extend out separately.

Figure 8:
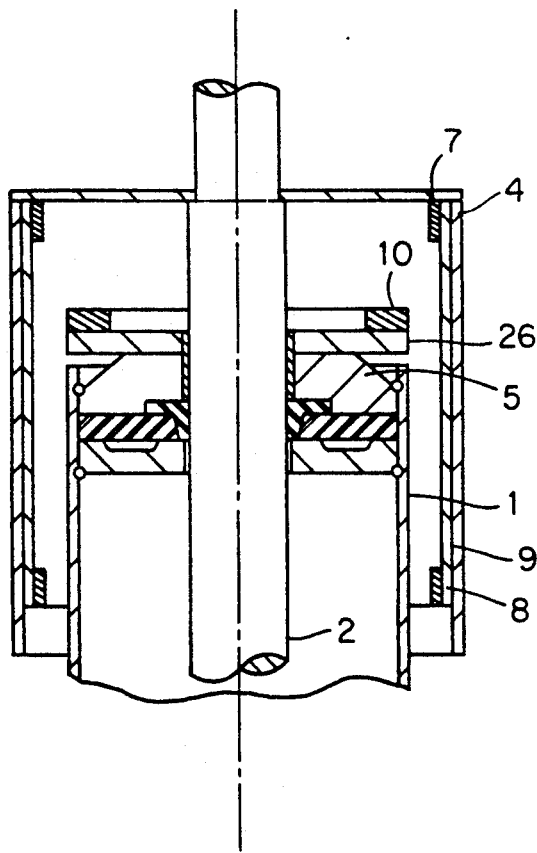
FIG. 8 illustrates part of a dashpot with a sensor mounted against the inner surface of the jacket and with a radially polarized magnet.

The hydraulic dashpot partly illustrated in FIG. 8 essentially comprises a cylinder 1 and a steel piston rod 2. The cylinder has a head 5. The piston rod is connected at the bottom to an unillustrated piston. A jacket 4 is forced over one end of the cylinder. A sensor that very precisely measures the speed and/or position of the piston inside the cylinder is integrated into the dashpot. It features an annular permanent magnet 10 radially polarized in relation to piston rod 2. The magnet is magnetically insulated from the conventionally steel cylinder 1 by a disk 26 of non-ferromagnetic material, aluminum for example. Such a disk can be eliminated if the cylinder and head are aluminum. The magnet can in this event be integrated into the head. A sensor winding 9 operates in conjunction with magnet 10. It has a test winding 7 and 8 at each end. The winding is mounted against the inner surface of a jacket 4 of ferromagnetic material, usually steel.

If cylinder 1, due to an irregularity in the roadway, moves relative to piston rod 2 and hence to the sensor winding 9 and test windings 7 and 8 that operate in conjunction with it, the magnetic field of magnet 10 will induce, due to the closed magnetic circuit constituted by the radially polarized magnet, the piston rod, and the jacket, a voltage in sensor winding 9. This voltage will be very precisely proportional to the speed of the vehicle's body in relation to its axis. A signal precisely representing the extreme positions of piston 3 will accordingly be generated in test windings 7 and 8.

No magnetic leakage that might contaminate the results will occur.

We claim:

1. A sensor for measuring selectively speed and position of a piston relative to a cylinder in a dashpot for motor vehicles, comprising: a cylinder and a piston mounted on a piston rod movable within said cylinder, said cylinder being a first part and said piston and piston rod being a second part in said dashpot; a permanent magnet mounted on one of said first and second parts; a sensor winding mounted on the other one of said first and second parts and having a coreless cylindrical coil cooperating operatively with said magnet and having sensor leads; a first auxiliary coil with first leads, mounted on the other one of said first and second ports, at one end of said sensor winding; and a second auxiliary coil with second leads, mounted on the other one of said first and second parts, at another end of said sensor winding, relative motion between said piston and said cylinder producing linear relative motion between said magnet and said sensor winding and inducing a voltage in said cylindrical coil dependent on relative velocity between said magnet and said sensor winding due to relative motion between said piston and said cylinder, said first auxiliary winding and said second auxiliary winding being locates respectively at first and second end positions of travel of said piston, said magnet inducing voltages in said first auxiliary winding and said second auxiliary winding when reaching respectively said first and second end positions.

2. A sensor as defined in claim 1, including a jacket with an inner surface connected to said piston rod, said sensor winding being connected to said inner surface.

3. A sensor as defined in claim 1, including a jacket of non-magnetic material with a wall connected to said piston rod, said sensor winding being mounted on said wall.

4. A sensor as defined in claim 1, wherein said cylindrical coil extends over the whole length of the sensor winding and said first and second auxiliary windings, said auxiliary windings having leads extending outward and located at ends of said sensor winding.

5. A sensor as defined in claim 1, wherein at least one of the leads in said sensor winding is connected to leads in said auxiliary windings.

6. A sensor as defined in claim 1, wherein said auxiliary windings have more turns per unit of length than said sensor winding.

7. A sensor as defined in claim 1, wherein said auxiliary windings have turns arranged in a plurality of layers.

8. A sensor as defined in claim 1, wherein said auxiliary windings have turns closer together than turns of said sensor winding.

9. A sensor as defined in claim 1, wherein said magnet comprises an annular array of individual magnets.

10. A sensor as defined in claim 1, wherein said magnet is an annular magnet.

11. A sensor as defined in claim 1, wherein said magnet is radially polarized relative to said piston rod.

12. A sensor as defined in claim 1, including a mounting for said magnet and a mounting for said sensor winding forming a closed magnetic circuit with said magnet.

13. A sensor as defined in claim 1, including a mounting for said magnet and a mounting for said sensor winding forming a closed magnetic circuit with said magnet, said magnet being radially polarized relative to said piston rod and comprising an annular magnet surrounding said sensor winding.

* * * * *